United States Patent
Danielsen et al.

(10) Patent No.: US 10,523,870 B2
(45) Date of Patent: Dec. 31, 2019

(54) CONTEXTUAL DISPLAY

(71) Applicant: Elliptic Laboratories AS, Oslo (NO)

(72) Inventors: Laila Danielsen, El Cerrito, CA (US); Guenael Thomas Strutt, San Francisco, CA (US); Rachel-Mikel Arcejaeger, Mokelumne Hill, CA (US); Øyvind Stamnes, Oslo (NO); Tom Øystein Kavli, Nittedal (NO); Erik Forsström, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 0 days.

(21) Appl. No.: 16/223,546

(22) Filed: Dec. 18, 2018

(65) Prior Publication Data

US 2019/0199935 A1    Jun. 27, 2019

Related U.S. Application Data

(60) Provisional application No. 62/608,965, filed on Dec. 21, 2017.

(51) Int. Cl.
*H04N 5/232* (2006.01)
*G06K 9/00* (2006.01)
(Continued)

(52) U.S. Cl.
CPC ....... *H04N 5/232935* (2018.08); *G01S 15/58* (2013.01); *G06F 3/017* (2013.01);
(Continued)

(58) Field of Classification Search
CPC ......... H04N 5/232935; H04N 5/23219; H04N 5/2628; H04N 5/232939; G06K 9/00221; G06T 7/536; G06F 3/017; G01S 15/58
See application file for complete search history.

(56) References Cited

U.S. PATENT DOCUMENTS

| | | | |
|---|---|---|---|
| 2009/0164896 A1* | 6/2009 | Thorn | G06F 1/1626 715/700 |
| 2012/0287163 A1* | 11/2012 | Djavaherian | G09G 5/00 345/667 |
| 2016/0219217 A1* | 7/2016 | Williams | H04N 5/23293 |

FOREIGN PATENT DOCUMENTS

| | | |
|---|---|---|
| EP | 2428864 A2 | 3/2012 |
| EP | 2615524 A1 | 7/2013 |

(Continued)

OTHER PUBLICATIONS

Yoong, Kok Kai, et al., "Face Recognition with CTFM Sonar," in C. Sammut (eds), Australasian Conference on Robotics and Automation, Australian Robotics and Automation Association, Sydney, P.J. 2005, pp. 1-10.

*Primary Examiner* — Oschta I Montoya
(74) *Attorney, Agent, or Firm* — Winstead PC

(57) ABSTRACT

A method for controlling content on a display of an electronic device includes emitting from an ultrasound transducer located in the electronic device, a first ultrasound signal at least some portion of which is directed towards the user. The method also includes receiving a second ultrasound signal at a receiver transducer located in the electronic device. The second ultrasound signal includes a portion constituted by a the first ultrasound signal being reflected from the user face. The method also includes computing a distance between the user and the electronic device using acoustic measurements involving at least one acoustic transducer. The electronic device includes a memory storing at least two sets of predetermined display features. The electronic device is set to display a first set when the distance between the electronic device and the user is above at least one chosen threshold and the second set of display features when the distance is less than the threshold.

12 Claims, 3 Drawing Sheets

(51) Int. Cl.
    *G06T 7/536*     (2017.01)
    *G06F 3/01*     (2006.01)
    *G01S 15/58*     (2006.01)
    *H04N 5/262*     (2006.01)

(52) U.S. Cl.
    CPC .......... *G06K 9/00221* (2013.01); *G06T 7/536* (2017.01); *H04N 5/23219* (2013.01); *H04N 5/232939* (2018.08); *H04N 5/2628* (2013.01)

(56) References Cited

FOREIGN PATENT DOCUMENTS

| | | | |
|---|---|---|---|
| WO | WO-2015022498 A1 | 2/2015 | |
| WO | WO-2017098524 A1 | 6/2017 | |

\* cited by examiner

CONTEXTUAL DISPLAY

TECHNICAL FIELD

Present teachings relate to contextual display features for an electronic device.

BACKGROUND ART

In electronic devices, more particularly in mobile devices, infrared proximity sensing is commonly used to detect the presence of a user and/or the orientation of the device and to change the displayed information according to this, e.g. as shown in US2016/0219217, WO2017/098524, EP 2428864 and EP2615524. There is however neither enough range nor enough field of view ("FoV") to detect motion, for example, of the user's hand.

Display transitions may be accomplished using the touch-screen of the electronic device, however, the touchscreen may be difficult to use with the user's arm extended, for example for taking a self-portrait, or selfie. Moreover, the user is usually required to use a second hand, for example, to pinch and zoom with the touchscreen.

US2012/0287163A1 taught that automatically scaling the size of a set of visual content based upon how close a user's face is to a display. US2009/0164896A1 taught a technique for managing the display of content on a display of an electronic device based on a distance of the user to the display, where the distance may be estimated by analyzing video data to detect a face of the user.

Both these known solutions use the distance to change the scaling factor of the information on the screen, but it does not take into account that the distance between the device and the face is chosen by the user, depending on the context, and has a specific function that affects the type of information to be observed at the display.

There is, therefore, still a need for a method and a product that enables transition between relevant user interaction options based upon the context or usage of a device. At least some problems inherent to the prior-art will be shown solved by the features of the accompanying independent claims.

SUMMARY OF INVENTION

The present invention thus provides a device and method adjusting the information on the display on the context, especially but not specifically to situations such as so-called "selfies" or self-portraits, where the content of the display will depend on the distance between the device and the user face. For example shifting from showing a camera preview, to showing static images without the user requiring to touch a button or screen. After a selfie image has been captured and the phone is brought closer to the head of the user, the captured image is zoomed in. When the arm is extended again, the image zooms out and the viewfinder becomes active again.

According to the known art the user need to touch the gallery icon and use the pinch and zoom touch gesture or other touch tools to zoom in and out on the face. This can be time consuming and can potentially lead to missed photo opportunities.

BRIEF DESCRIPTION OF DRAWINGS

The invention will be discussed more in detail with reference to the drawings, illustrating the invention by way of examples FIG. 1A,B illustrates an aspect of the teachings where a mobile device adapts its display content based upon the context.

DETAILED DESCRIPTION

Figures 1A, 1B:
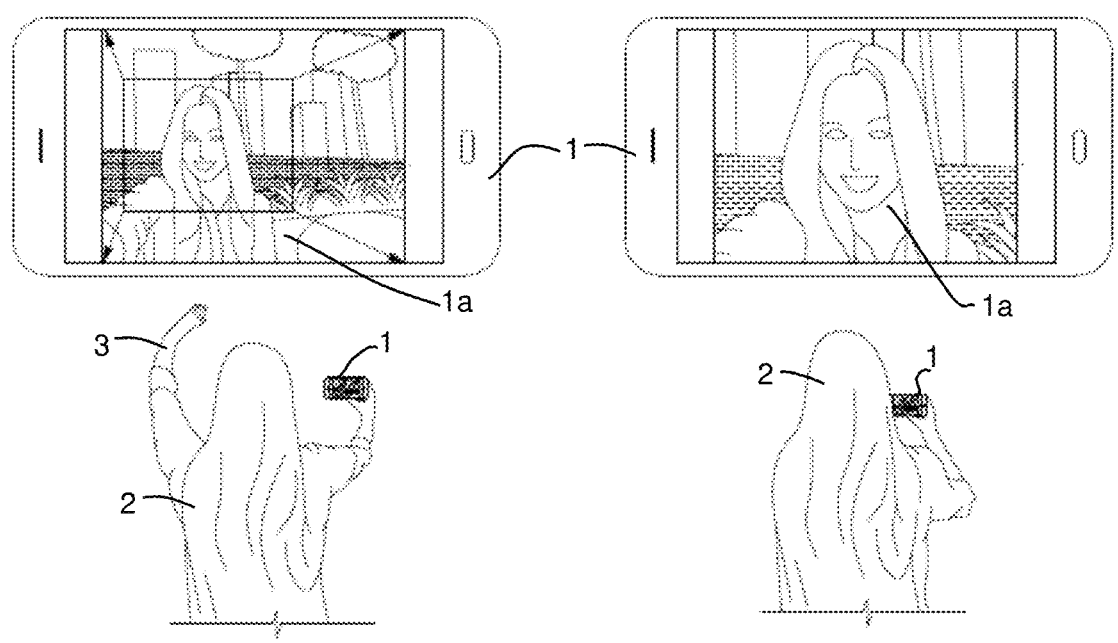

FIGS. 1A and 1B show a first example for a relatively quick and intuitive way to zoom in and out on a captured selfie image according an aspect of the present teachings where FIG. 1A illustrates the long distance display mode and FIG. 1B illustrates the short distance display mode. In FIG. 1A the user 2 takes a selfie where the preview images on the display 1a of the device or mobile phone 1 shows the complete scene, thus allowing for composing the preferred image, e.g. including the background scenery. The exposure of the picture may be controlled on the display 1a, for example using touchless interface based on gestures 3, e.g. as described in WO2015/022498 or automatically when the face is in focus.

In FIG. 1B the device 1 detects that it is moved close to the user 2 and thus provides a detail images on the display 1a allowing the user to inspect the exposure of the face, and of course to zoom out to see the complete images using standard gestures or menus.

This provides one handed zoom functionality allowing users to quickly find out if a captured selfie is of good quality by magnifying the part of the image that contains the face or zooming into the center of the image when the user 2 brings the device 1 closer. When the arm is extended again increasing the distance, the image zooms out and the viewfinder functionality of the display 1a becomes active again.

When a face is detected in the viewfinder this may be marked by a rectangle around the face as illustrated in FIG. 1A.

The present solution may be used to switch display contexts between the long and short distance display modes, for example:

Camera context vs gallery context: with the arm extended, the screen shows the feed from the front facing camera. With the phone close to the body, the screen shows the last photo taken (the Gallery).

Full shot vs zoomed shot: with the arm extended, the screen shows the full shot. With the phone close to the body, the screen shows the zoomed-in face, as illustrated in FIG. 1A,B.

Full shot vs customization view: with the arm extended, the screen shows the full shot. With the phone close to the body, the screen shows the sharing/customization/imaging editing options in social media.

The face detection is preferably performed using an imaging unit such as a camera using well known face detection algorithms, e.g. as referred to in the abovementioned publications. Alternatively, it may be include 3D imaging and recognition of a face, or possibly an acoustic imaging unit as suggested in the article Yoong, K. & McKerrow, P. J. 2005, 'Face recognition with CTFM sonar', in C. Sammut (eds), Australasian Conference on Robotics and Automation, Australian Robotics and Automation Association, Sydney, pp. 1-10 describing the use of acoustic signals for recognizing a face.

Image based analysis may be used to estimate a distance based on known feature in a recognized face, but this is slow and inaccurate, and also of course relies on the recognition of a face, which is not always easy. The present invention is therefore based on acoustic distance measurements, possibly with aid from the image processing, e.g. setting limits to the scanned distance range of the measurements.

The acoustic measurements may be based on well-known techniques such as pulse echo, chirp, encoded signals, resonance measurements or similar methods using available transducers emitting acoustic signal and measuring the time lapse before receiving the echo. Preferably the acoustic measurements are performed in the ultrasound range, outside the audible range, but possibly close to the audible range making it possible to use transducers already existing in the device operating in the audible range. By controlling the emitted frequency and analyzing the reflected signal the relative movements between the user 2 and the device 1 may also be detected e.g. using well known Doppler analysis. In other words, the acoustic measurement may include analysis in the time and frequency domain.

The preferred algorithm therefore creates estimates of the motion of the device with an acoustic transducer relative to an acoustic reflector, presumably the head of the user. By design, in the case using doppler when the device is still or a selected action is performed, the position is reset, so any motion is measured relative to this position. This estimate is based on accumulating the velocity of the reflector relative to the device, where velocity is estimated using the Doppler effect. As an alternative the movements may simply be found by monitoring the change in the measured distance using a sequence of emitted acoustic codes or patterns.

When measuring the movement between the user and the device continuously the displayed information may also be changed continuously, e.g. by using animations illustrating the movements or continuously zooming in on a captured image or the image on the display.

Figure 2:
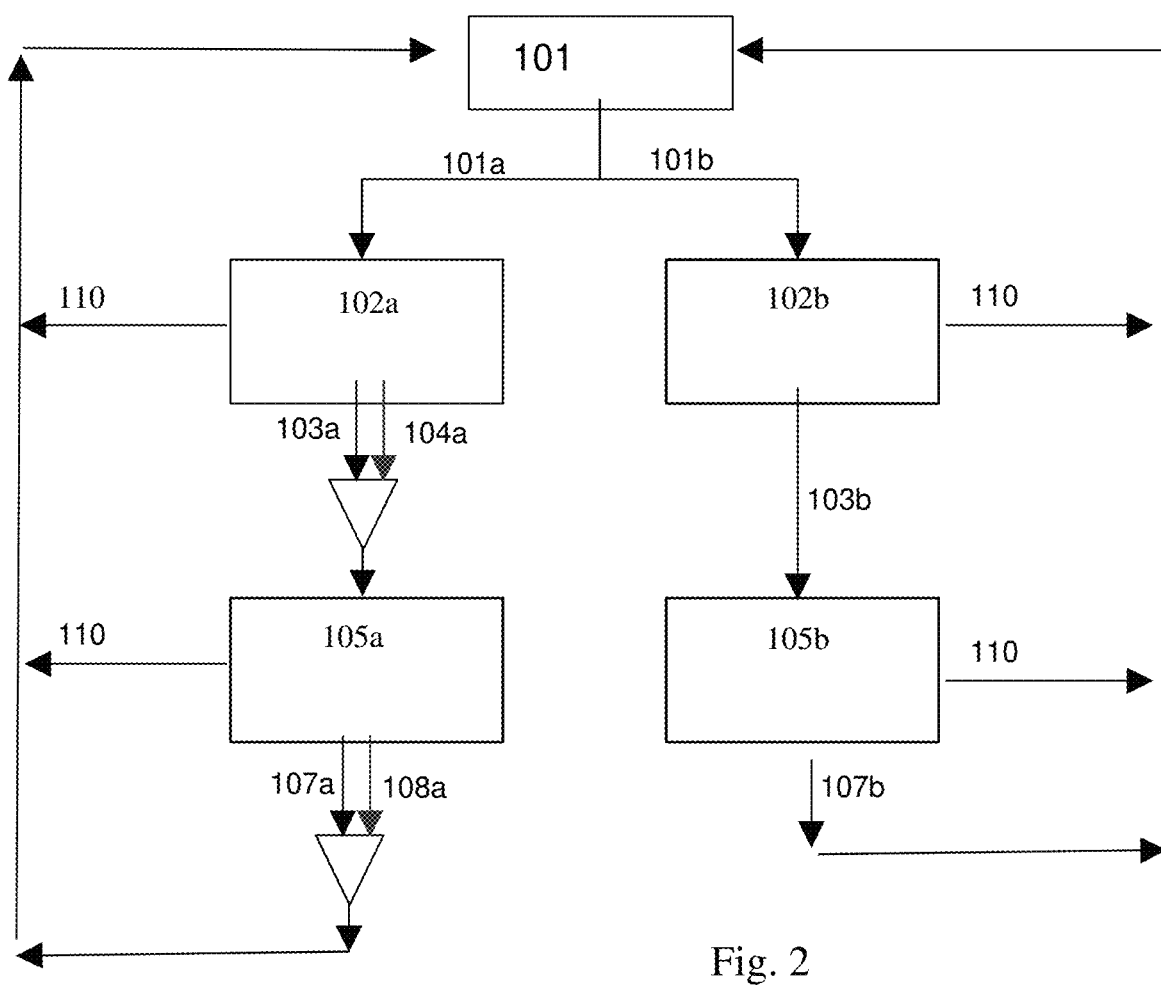
FIG. 2 illustrates a flow chart for the use of the present invention.

FIG. 2 illustrates a process of the imaging starting with the camera being activated. A live image 101 is scanned for detecting a face. If a face is recognized 101a the image is captured with a face 102a. Also, the distance and/or movement is sensed acoustically 103a and possibly also by monitoring the face 104a. To determine if the device has been moved towards the head after an image of a face has been captured, a combination of ultrasonic detection and facial recognition is used.

If the device is moved toward the face the image may be zoomed in to concentrate on the face 105a, and if a movement away from the face is detected acoustically 106a and/or visually 107a the image will go back to the live preview mode 101 again.

Also, it is possible to go back to the live view mode 101 at any stage by giving a back commend 110 by gestures or pressing a back button.

If a face is not detected 101b, the image 102b is taken without a recognized face, in which case the distance and/or movement is only measured acoustically 103b and if moved toward the user the central part of the image may be shown 105b, and when the distance increases 107b the system goes back to the live view mode 101, and in that step also scanning for faces again.

The facial recognition part may use the size of the bounding box around the face to determine if the device has been moved towards or away from the face after image capture or indicate the approximate distance based on the distance between certain features in the recognized face in the images samples during the process. In that case, when the facial box has increased in size above a given threshold, zoom on the display is triggered.

Figure 3A:
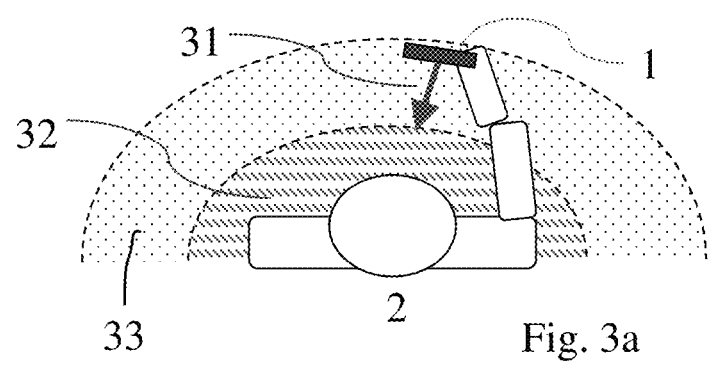
FIG. 3a, b illustrates the use of the device according to the invention.

As stated above and illustrated in FIG. 3a the method according to the present invention involves a device 1 sending an ultrasonic signal 31 and analyzing the echo. It allows fine-grain measurement of distance between phone 1 and body 2 (something that neither facial recognition nor inertial sensors can provide). It has drawbacks, such as picking up reflections from other people 34 and hand/arms of the user. Therefore, it is advantageous to include a solid reference (provided by facial recognition) providing an initial distance range 33. It also may also be set to react only when having large evidence of motion (to filter out accidental motion measurements), so the response will be delayed. Inertial sensors can be used to reduce the delay in the response.

The transducers used according to the present solution may depend on the device, preferably based on a separate transmitter and receiver, but other well-known constellations may also be contemplated such as a single transmitter/receiver device, or arrays, pairs or matrixes adding directivity to the emitted and/or received signal, e.g. for suppressing reflectors outside the field of view of the camera or taking into account the known lobes of the emitters and receivers. This way the other peoples 34 or objects in the image may be removed from the distance measurements. If a recognized face occurs in the image a directional system may automatically select the recognized face, or this may be selected by the user.

The motion of the phone when using the camera according to the present invention will be largely perpendicular to the screen. Inertial sensors may therefore be well suited to detect the onset of motion. Inertial sensors can suffer from drift, but facial recognition and ultrasound distance measurements can be used for correcting the drift.

The facial recognition provides a rough measurement of distance and may be used to set an expected distance range 33 as the size of the features is recognized, but reliably identifies the primary user. The distance range approximated based on the facial recognition may also be used to adjust for arm length of the user or other choices made during the operation. This way the combination of the two may eliminate the risk of capturing motion from bodies on the side, or reflections from limbs, from points being outside the suggested range. The range 33 may also be linked to the threshold to the range 32 within which the image is enlarged to show the face or show other features on the display as discussed above in the close range display mode.

Alternatively, the range 33 may be defined by the detected motion. If a motion between the device and the user is detected and being above a predetermined limit in time or amplitude the display may change in the same way as if the measurements provided an absolute distance measurement.

The exact ranges may vary, e.g. being dependent on the age and length of the persons arms, and may be set as user preferences.

Figure 3B:
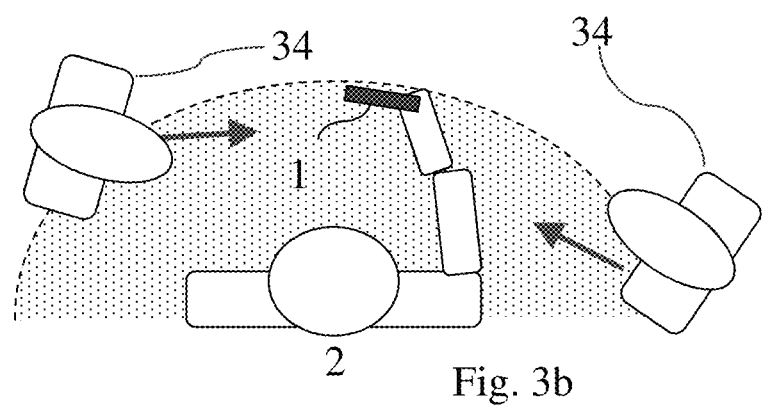

Typical user characteristics such as arm length and other variables may also be based on inputs in the device available to the algorithm and statistics based on earlier use. The measured size of the recognized facial features may also be monitored continuously so as to track any changes in the distance range and through that processes be able to avoid or suppress acoustic reflections from other people, arms etc. close to the device as is illustrated in FIG. 3b where the reflexes from the persons 34 on the side, is ignored.

While the figures illustrate the device held by a person the present invention would also work if the device was stationary, e.g. placed on a support, and the user moves relative to the device. For example of the required distance between the camera and the user is to large to capture both scenery and the user.

To summarize the present invention relates to a device and a method for controlling displayed content on an electronic device including said display and a camera having a known field of view.

The method comprising the steps of:

Emitting from an ultrasound transducer located in said device, a first ultrasound signal at least some portion of which being directed towards the user being positioned within the field of view covered by the imaging unit.

Receiving a second ultrasound signal at a receiver transducer located in said device. The second ultrasound signal includes a portion being constituted by a the first ultrasound signal being reflected from said user face. So that the for example the propagation time may be used to calculate the distance between the device and the face.

The distance is then computed between the user and the electronic device using acoustic measurements involving at least one acoustic transducer being capable of both transmitting and receiving the acoustic signals or specific transducers for sending and receiving the signal, in which the transducers may be synchronized to measure the propagation time.

The device also includes a memory storing at least two sets of predetermined display features, where the device is set to display a first set when the distance between the device and the user is above at least one chosen threshold, and the second set of display features when the distance is less than said threshold.

The number of thresholds may depend on the function and application and may range from one to, in some case a sufficiently high number to allow continuous change in the display depending on the distance. Thus the display is made dependent on the measured range to the user, where the display can be continuously changed as animations, image transformations, or user interface modifications, or the display can change between two predetermined states (images) depending on whether the detected range is above or below defined thresholds.

In addition the movement of the device relative to the user or face may be measured, e.g. by analyzing the reflected acoustic signal for detecting a Doppler shift relative to the emitted signal. Based on the movements the estimated trajectory of the movement may be used for estimating the time for changing between said sets of display features, and may also be used for presenting or illustrating the measured movements on the screen, for example by using animations or zooming in on a captured image as a function of the measured movement.

The movement and trajectory is usually related to both movements along the line between the device and the face, but relative movements perpendicular to this may also be used, e.g. based on the movements of a recognized face over the screen.

The imaging unit or camera is preferably capable of identifying at least some facial features of a user facing the device, wherein the imaging unit is operatively coupled to the electronic device. The size of the recognized face features may be used to estimate an approximate distance between the device and the user face, and to set a limited range for the distance calculated from the acoustic signal, thus ignoring signal occurring from objects outside said range and in this way avoid possible disturbances from outside the range.

The display sets may include two or more distance thresholds, so that when the device is outside a first threshold the shutter controls related to the imaging means on the electronic device are activated, when the device is inside the first threshold but outside the second threshold the shutter controls of the device are hid, and when the device is inside the second threshold the display zoom control is activated.

The device may be operated manually or be activated when sensing a movement in the direction between the imaging means and the user, e.g. using an inertial sensor.

The electronic device according to the invention will therefore comprise an imaging unit including a face recognition circuitry, an acoustic measuring unit including emitter for transmitting an acoustic signal with predetermined characteristics and a receiver for receiving and analyzing said acoustic signals, and measuring the distance, and possibly also a relative movement, between a user face and the device. As mentioned above the transmitter and receiver may be separate units or be constituted by the same transducer.

The device comprises a display adapted to show the imaged area and chosen information as well as a display control adapted to present a first set of information on the display when the distance is above a chosen threshold and a second set of information when the distance is below said threshold. Each set of display information may be stored in a user accessible memory, the type of information being chosen by a user.

The present invention also relates to a software product implementing at least some of the features of the method for controlling the electronic device disclosed herein.

What is claimed is:

1. A method for controlling content on a display of an electronic device, the method comprising:
    emitting from an ultrasound transducer located in the electronic device, a first ultrasound signal at least some portion of which being directed towards the user;
    receiving a second ultrasound signal at a receiver transducer located in the electronic device; the second ultrasound signal comprising a portion being constituted by a the first ultrasound signal being reflected from the user face;
    computing a distance between the user and the electronic device using acoustic measurements involving at least one acoustic transducer;
    wherein the electronic device comprises a memory storing at least two sets of predetermined display features, the electronic device being set to display a first set when the distance between the electronic device and the user is above at least one chosen threshold, and the second set of display features when the distance is less than the threshold;
    at least two distance thresholds;
    wherein when the electronic device is outside a first threshold the shutter controls related to the imaging means on the electronic device are activated;
    wherein when the electronic device is inside the first threshold but outside the second threshold the shutter controls of the device are hid; and
    wherein when the electronic device is inside the second threshold the display zoom control is activated.

2. The method according to claim 1, comprising a step of measuring the movement of the electronic device relative to the user, and presenting the measured movement on the display.

3. The method according to claim 2, wherein the movement is measured by analyzing the reflected acoustic signal for detecting a Doppler shift relative to the emitted signal.

4. The method according to claim 2, wherein the estimated trajectory of the movement is used for estimating the time for changing between the sets of display features.

5. The method according to claim 1, comprising a step of identifying at least some facial features of a user facing the electronic device using an imaging unit being operatively coupled to the electronic device.

6. The method according to claim 5, wherein the size of the recognized face features is used to estimate an approximate distance between the electronic device and the user face, so as to set a limited range for the distance calculated from the acoustic signal, thus ignoring signal occurring from objects outside the range.

7. An electronic device comprising:
an imaging unit comprising a display; and
an acoustic measuring unit comprising emitter for transmitting an acoustic signal with predetermined characteristics;
a receiver for receiving and analyzing the acoustic signals, and measuring the distance between a user in front of the device and the electronic device;
wherein the electronic device comprising display control is adapted to present a first set of information on the display when the distance is above a chosen threshold and a second set of information when the distance is below the threshold;
wherein when the electronic device is outside a first threshold the shutter controls related to the imaging means on the electronic device are activated;
wherein when the electronic device is inside the first threshold but outside the second threshold the shutter controls of the device are hid; and
wherein when the electronic device is inside the second threshold the display zoom control is activated.

8. The electronic device according to claim 7, comprising face recognition circuitry comprising an imaging device.

9. The electronic device according to claim 8, wherein the imaging unit is adapted, based on the size of the measured features of the user, to calculated an approximate distance range between the user and the device, the acoustic measuring unit calculating the distance based reflected signals within the approximate range.

10. The electronic device according to claim 7, wherein each set of display information is stored in a user accessible memory, the type of information being chosen by a user.

11. The electronic device according to claim 7, where the acoustic unit is adapted to measure movements in the direction between the user and the electronic device.

12. A computer-program product comprising a non-transitory computer-usable medium having computer-readable program code embodied therein, the computer-readable program code adapted to be executed to implement a method for controlling content on a display of an electronic device, the method comprising:
emitting from an ultrasound transducer located in the electronic device, a first ultrasound signal at least some portion of which being directed towards the user;
receiving a second ultrasound signal at a receiver transducer located in the electronic device; the second ultrasound signal comprising a portion being constituted by the first ultrasound signal being reflected from the user face;
computing a distance between the user and the electronic device using acoustic measurements involving at least one acoustic transducer;
wherein the electronic device comprises a memory storing at least two sets of predetermined display features, the electronic device being set to display a first set when the distance between the electronic device and the user is above at least one chosen threshold, and the second set of display features when the distance is less than the threshold;
at least two distance thresholds;
wherein when the electronic device is outside a first threshold the shutter controls related to the imaging means on the electronic device are activated;
wherein when the electronic device is inside the first threshold but outside the second threshold the shutter controls of the device are hid; and
wherein when the electronic device is inside the second threshold the display zoom control is activated.

* * * * *